(12) United States Patent
Levett

(10) Patent No.: US 7,925,777 B2
(45) Date of Patent: Apr. 12, 2011

(54) CONTENT BASED DATA ROUTING

(75) Inventor: David Lawrence Levett, Woking (GB)

(73) Assignee: Integra SP Limited, London (GB)

( * ) Notice: Subject to any disclaimer, the term of this patent is extended or adjusted under 35 U.S.C. 154(b) by 807 days.

(21) Appl. No.: 10/497,125

(22) PCT Filed: Dec. 9, 2002

(86) PCT No.: PCT/GB02/05577
§ 371 (c)(1), (2), (4) Date: May 28, 2004

(87) PCT Pub. No.: WO03/049369
PCT Pub. Date: Jun. 12, 2003

(65) Prior Publication Data
US 2005/0021838 A1 Jan. 27, 2005

(30) Foreign Application Priority Data
Dec. 7, 2001 (GB) .................................. 0129381.0

(51) Int. Cl.
G06F 15/173 (2006.01)
G06F 15/16 (2006.01)
(52) U.S. Cl. ...................... 709/238; 709/217; 709/223
(58) Field of Classification Search .................. 709/236, 709/238, 242, 204, 205, 225, 227, 228, 217–218, 709/240, 224; 370/473–476; 707/100
See application file for complete search history.

(56) References Cited

U.S. PATENT DOCUMENTS

| 5,961,601 | A | * | 10/1999 | Iyengar | 709/229 |
| 5,996,011 | A | * | 11/1999 | Humes | 709/225 |
| 6,021,443 | A | * | 2/2000 | Bracho et al. | 709/241 |
| 6,023,723 | A | * | 2/2000 | McCormick et al. | 709/206 |
| 6,052,709 | A | * | 4/2000 | Paul | 709/202 |

(Continued)

FOREIGN PATENT DOCUMENTS

EP 1 016 989 A2 7/2000

OTHER PUBLICATIONS

Walsh, Norman, "What is XML?" Online! Oct. 3, 1998, retrieved from the Internet: <URL:http://www.xml.com/pub/a/98/10/guide1.html>, retrieved on Nov. 4, 2010.

(Continued)

*Primary Examiner* — Shawki S Ismail
*Assistant Examiner* — Farzana Huq
(74) *Attorney, Agent, or Firm* — Saul Ewing LLP

(57) ABSTRACT

A method of routing data from a source to one or more clients over a network, where the data conforms to a structured meta-language; in which the routing is performed by a server applying rules to the data itself, and not any address accompanying the data, to determine where to route that data to. The present invention is predicated on the counter-intuitive insight that data does not need to be concealed within a data envelope and given an address label in order to be routed effectively and efficiently. Instead, routing can be performed on the actual content of a message by applying simple routing rules to the data itself by intelligent 'routing' servers within the network which can unpack data from their message envelopes and intelligently filter/combine them with data unpacked from other messages to achieve a routing function.

25 Claims, 3 Drawing Sheets

U.S. PATENT DOCUMENTS

| | | | |
|---|---|---|---|
| 6,230,271 B1* | 5/2001 | Wadlow et al. | 726/1 |
| 6,266,664 B1* | 7/2001 | Russell-Falla et al. | 707/5 |
| 6,324,584 B1* | 11/2001 | Mandalia | 709/238 |
| 6,330,610 B1* | 12/2001 | Docter et al. | 709/229 |
| 6,434,618 B1* | 8/2002 | Cohen et al. | 709/228 |
| 6,480,885 B1* | 11/2002 | Olivier | 709/207 |
| 6,594,268 B1* | 7/2003 | Aukia et al. | 370/400 |
| 6,598,034 B1* | 7/2003 | Kloth | 706/47 |
| 6,654,787 B1* | 11/2003 | Aronson et al. | 709/206 |
| 6,714,778 B2* | 3/2004 | Nykanen et al. | 455/414.1 |
| 6,816,830 B1* | 11/2004 | Kempe | 704/9 |
| 6,957,214 B2* | 10/2005 | Silberberg et al. | 707/763 |
| 7,127,741 B2* | 10/2006 | Bandini et al. | 726/14 |
| 7,133,845 B1* | 11/2006 | Ginter et al. | 705/51 |
| 7,167,901 B1* | 1/2007 | Beadle et al. | 709/207 |
| 7,266,684 B2* | 9/2007 | Jancula | 713/156 |
| 7,339,937 B2* | 3/2008 | Mitra et al. | 370/395.53 |
| 2001/0003828 A1* | 6/2001 | Peterson et al. | 709/219 |
| 2001/0013062 A1* | 8/2001 | Ono | 709/218 |
| 2002/0023172 A1* | 2/2002 | Gendron et al. | 709/238 |
| 2002/0059333 A1* | 5/2002 | Tribbeck | 707/500 |
| 2002/0099834 A1* | 7/2002 | Sielaff et al. | 709/228 |
| 2002/0143659 A1* | 10/2002 | Keezer et al. | 705/27 |

OTHER PUBLICATIONS

International Search Report, dated Jul. 22, 2003, issued in priority International Application No. PCT/GB02/05577.

* cited by examiner

CONTENT BASED DATA ROUTING

CROSS REFERENCE TO RELATED APPLICATIONS

This application claims the priority of PCT Application No. PCT/GB02/05577 filed on Dec. 9, 2002, and British Application GB 0129381.0 filed on Dec. 7, 2001, the contents of which are hereby incorporated by reference.

FIELD OF THE INVENTION

This invention relates to data routing. In particular, it relates to routing of data which conforms to a structured meta-language such as the self-describing X meta-language. The term 'routing' refers to any process for directing data from its source to its intended recipient. Messages which implement web services can be routed using this invention.

DESCRIPTION OF THE PRIOR ART

Prior art routing of data relies on data being packaged into a data envelope, with routing decisions based on an address placed on the data envelope; conventionally, the combination of data, plus envelope, plus address is called a 'message'. The approach of 'address based' 'message' routing is used inter alia in:
(a) direct messaging systems (e.g. e-mail/SMTP; peer-to-peer Instant Messaging);
(b) store and query systems (e.g. relational databases like Oracle®, which allow clients to send specific queries to a server and receive a response);
(c) publish and subscribe systems (e.g. Usenet, which allows clients to view/download data and media files from a server);
(d) remote execution systems (e.g. RMI for C and Java®, which allows clients to directly execute specified functions of a remote application over a network);
(e) transaction management middleware systems (e.g. Tuxedo®, which allows a client to safely execute complex transactions where a client can request one or more related operations to be carried out on one or more remote systems and guarantee that these are only successfully completed if all operations are valid);
(f) message queuing middleware systems (e.g. IBM® MQ Series, Tibco®, which allow a client to request that a message be sent to a remote server, and the message queue uses store-and-forward mechanisms to guarantee delivery even if the server is unavailable at the time the message was sent);
(g) distributed object systems (e.g. CORBA®, DCOM, which allow for a client to execute methods of a remote object by means of a proxy class or service accessed through a request broker);
(h) filtering systems (e.g. firewalls and email filtering systems, which allow an administrator to set rules about how different types of messages should be diverted as they travel through the system using filtering criteria such as size, source, destination, security needs, network needs, virus detection);
(i) network level routing systems (e.g. Cisco® internet routers, which allow clients to send messages as a series of small packets to a server over a complex network of interconnected computers such as the internet, using low-level protocol addressing to identify the destination and ordering of each package);
(j) network level broadcast systems (e.g. m-Bone, that allows a server to use appropriately configured network servers and routers to distribute or broadcast message packets to many clients simultaneously).

But if one is delivering real time messages which can change rapidly (e.g. many times a second) from hundreds or thousands of web services to potentially thousands of users (or more), then this kind of 'address based' message routing inevitably leads to significant problems. For example, where mass message distribution uses a publish/subscribe model to broadcast continuously updating information, then to ensure the correct messages have been received by all clients, the server which publishes the information is constrained by the lowest bandwidth of a connected client, and may have to cache ever increasing (and potentially huge) amounts of data if the network is slow. In many audio and video broadcast applications, this can be partly solved by 'dropping' message packets due to network congestions, but this results in a loss of quality of the resulting sound or image.

With most web-services (as will be described in more detail later in this section), ad-hoc 'dropping' of message packets is unacceptable, so the only options available today are to reduce the size and quantity of messages, or increase the bandwidth of the network. Where direct messaging systems or store/query systems are used, then the volume of data traffic can increase roughly as the product of the number of web services and the number of users; this rate of increase can be unmanageable where you have hundreds of web services, each potentially needing to deliver thousands of updating messages a second to tens of thousands of users.

In addition to the network strain imposed by address based routing, there is an economic cost to end users: as these end users may increasingly pay for data received on a per-bit basis, 'address based' message routing is potentially very inefficient and costly, particularly for large commercial users with many hundreds or thousands of clients, who will otherwise find themselves in effect paying heavily for the same data to be sent many times over to respond to identical queries. Alternatively, users pay for excess bandwidth to allow for the rare peak conditions they experience at certain points in an application.

A more efficient and effective way of routing data (typically XML data, or a variant of XML) would be a compelling proposition. The present invention is such a proposition. It finds particular application in routing web services related messages. A 'web-service' in essence involves the supply of data and/or executable code to a client device over the Internet or other network; it is a structured message based communication between two or more computer applications or functions, on the same or different machines, where the communication happens over a public, private or local network and where one application/function is providing a service to another application/function. Web-services may for example allow a user to access applications (which would conventionally reside on the client device) from a remote provider on a pay per use basis over a wide area network such as the Internet. The term 'web-service' therefore may for example cover the service of supplying self-contained, self-describing applications that can be published or invoked across the Internet, as well as those applications themselves. Another example could be an application that executes to convert foreign exchange prices or, more simply, merely supplies up to date stock prices or traffic information. Web-services share the common feature that they are delivered using messages. Program developers can aggregate web-services together to form complex, integrated applications, but doing so requires the data being provided by each web-service to be routed efficiently to the correct destinations.

SUMMARY OF THE PRESENT INVENTION

In a first aspect of the present invention, there is a method of routing data from a source to one or more clients over a network, where the data conforms to a structured meta-language, the routing being performed by a server applying one or more rules to the data, and not any address accompanying the data, to achieve correct routing of that data,
characterised in that one or more messages are unpacked in order to yield the data and the routing server (a) applies the or each rule to this unpacked data or one or more sub-sets of this unpacked data and then (b) constructs one or more messages using some or all of the data or data sub-set(s).

The present invention is predicated on the counter-intuitive insight that data does not need to be concealed within an envelope, with the envelope including an address label, in order to be routed effectively and efficiently. Instead, routing can be performed on the actual content of the data by applying simple routing rules to the data itself by 'routing' servers within the network. A routing server is any kind of computing device able to apply rules, such as perform queries.

The data against which the rules are applied may form the content (i.e. the information of interest to an ultimate recipient) of and be extracted from a single, whole message, or be a part of a message, or be parts of several messages, or an aggregate of several messages. The data exiting a routing server does not therefore have to be the same as the data in any message entering the routing server, unlike prior art routing approaches, which preserve the integrity of all messages.

The term 'message' used in this specification means the combination of data (i.e. content of interest to a message recipient) plus data envelope; it does not necessarily (although it may) cover conventional messages which include address information in a header. Hence, in the present invention, the routing may be performed by the server applying one or more routing rules to the content of interest to a message recipient when there is no address accompanying that data. Equally, there may be an address accompanying the data, but that address is ignored by the server when applying its routing rules.

Single or multiple messages can be constructed by the routing server using the data or data sub-sets from one or several incoming messages.

In a second aspect, there is an apparatus programmed to route data from a source to one or more clients over a network, where the data conforms to a structured meta-language; wherein the apparatus applies one or more rules to the data, and not any address accompanying the data, to achieve correct routing of that data;
characterised in that the apparatus (a) unpacks one or more messages in order to yield the data and then (b) applies the or each rule to this unpacked data or one or more sub-sets of this unpacked data then constructs one or more messages using some or all of the data or data sub-set(s).

In a third aspect, there is a message when routed using the method of routing as defined above.

Further aspects and details of the invention are specified in the appended claims

BRIEF DESCRIPTION OF THE DRAWINGS

The present invention will be described with reference to the accompanying drawings, in which.

DETAILED DESCRIPTION OF A PREFERRED IMPLEMENTATION

The present invention will be described with reference to an implementation from Altio Limited of London, UK, called the Presentation Server. The Presentation Server provides the routing functionality described in the preceding sections. To re-cap on the fundamentals, the prior art approach is for messages to include an address header and for an incoming message to be routed as a unitary block, not to be analysed in any way, other than for its address to be read and used in the routing operation. The present invention challenges this orthodoxy by requiring that the data content of messages be unpacked and be subject to rule based filtering in order to achieve routing, with outgoing re-packaged messages comprising data from any combination of the whole or part of one or more incoming messages (e.g. the sub-set(s) of the data of one or more incoming messages, the entirety of one or more incoming messages, the sub-set(s) of some messages and the entirety of others etc.etc.).

Figure 1:
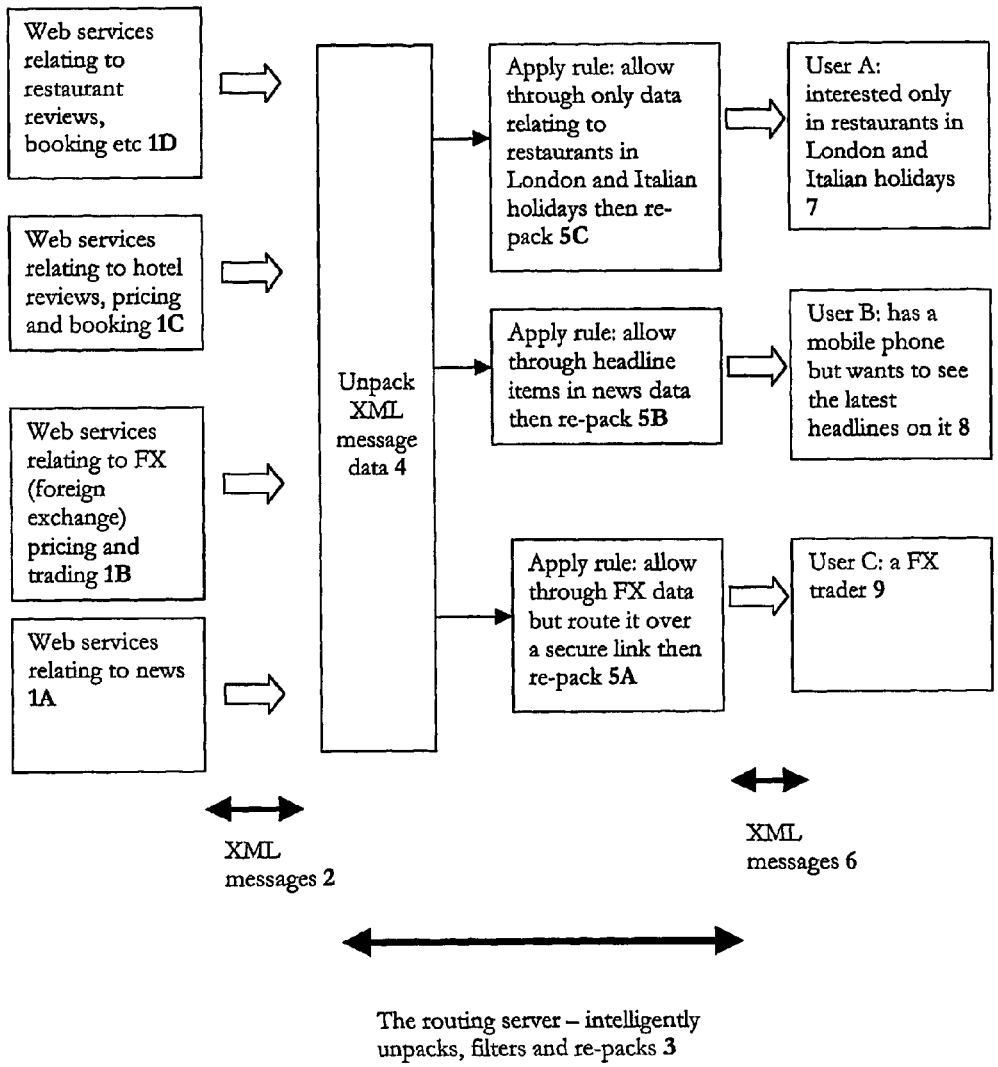
FIGS. 1, 2 and 3 are schematics of the overall system architecture of a message routing system in accordance with the present invention.

The entire approach could be summarised as intelligently 'unpack—filter—repack' at the routing server. FIG. 1 is a schematic representation of this approach. In FIG. 1, there are several different kinds of web services 1A to D (1A: news related. 1B: FX pricing and trading, 1C: hotel reviews. 1D: restaurant reviews). The web services related data is sent as XML messages 2 to a routing server 3. The routing server 3 unpacks 4 the XML message data content and then applies different rules 5A, 5B and 5C to that content. Rule 5A allows through only FX related data, routed over a secure link. Rule 5B allows through news. Rule 5C allows through data relating to London restaurants and Italian holidays. Content satisfying a rule is then repackaged into XML messages 6 and sent to the correct user 7, 8 and 9. In this way, a user 7, interested only in seeing data on restaurants in London and Italian holidays is served by rule 5C and hence routed only the data he is interested in. Similarly, user 8, wanting news headlines, is served by rule 5B. User 9, a FX trader, is served by rule 5A. In this example, user 7 receives data from two different web services message streams 1C and 1D. Users 8 and 9 however each receive data from a single web services message stream. More complex combinations are readily achieved.

A further example will illustrate this concept: Suppose that a stock exchange has 1000 different stocks, the prices of which are all changing in real time. The conventional approach to delivering this kind of information would be to host that information on a relational database and allow users connected over the internet to post queries to that database—e.g. "show me your current and historic pricing data on Intel®". This query is processed by the database and an answer returned to the user in an envelope with the IP address of the client computer which sent the original query. For commercial users, the query would not however relate to just a single stock, but to perhaps hundreds and refresh rates would have to be at short intervals to give accurate data. Multiply this by the tens of thousands of users that might simultaneously access a system, and the network traffic and load on the database server can become unmanageable.

Figure 2:
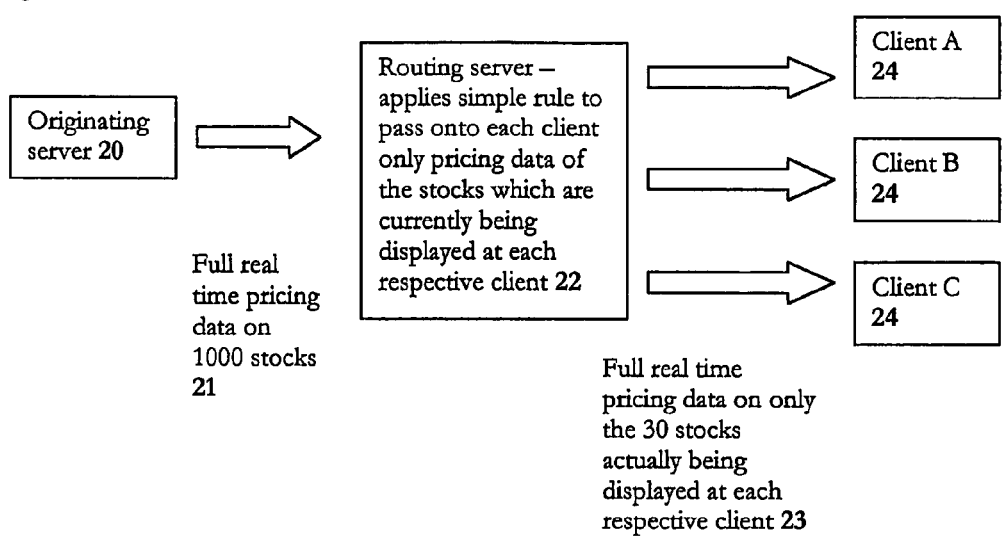

With the present invention, rules can be applied by routing servers to drastically diminish the traffic. For example, as illustrated in FIG. 2, an originating server 20 could be supplying real time price data 21 on 1000 stocks to a routing server 22. The routing server 22 could apply the single rule to forward on to a client only pricing data of the 30 stocks which are currently being displayed by that client. (This would require the routing server to be aware of what a client was displaying at any instant, but that is possible with systems such as the Presentation Server from Altio Limited of London UK). By applying this simple rule, the routing server in effect acts as a filter able to route the correct messages 23, and only the correct messages, to the appropriate clients 24.

Another extension of this principle is that the routing server can receive continuous real-time message feeds, and manage those feeds such that rather than sending all the messages on to a slow client, it can choose to send only the latest values of the information that has changed, (e.g. if a stock price changes 5 times since a slow-modem client received their last price quote for that stock, then the routing server can choose to send only the latest price and not the other 4).

The routing server can apply many different kinds of rules, such as the rules in the following, non-exhaustive list.

- Route messages based on a user's unique identifier—for example each user's portfolio information is unique to them, so the 'routing server' can support per-user routing in this way.
- Route messages based on security privileges—using the appropriate rules, the 'routing server' can enforce that messages are sent only to approved clients (e.g. a bank might only want to send branch specific information to each branch rather than sending every branch all the other branch's information).
- Routing messages based on rules about client and network performance—the individual performance of each client, and the level of congestion of their network could be used to control the quantity of information sent to the client.
- Routing based on rules about server performance—if one or more of the 'web services' servers becomes overloaded, the 'routing server' could be used to limit access to the busy server.
- A legacy system that was designed to support 20 users can be enhanced to support potentially thousands of users by relying on the 'routing server' to act on it's behalf to manage interactions with each of those thousands of clients. The 'routing server' rules allow this legacy system to delegate per-user customisation and security.
- Rules could be used to divert certain content of an incoming message over an expensive but highly secure network whilst some or all of the remaining content is sent through the public network.
- Rules could be applied to incoming messages to selectively encrypt and/or digitally sign portions of a message before passing it on reducing the CPU cost of the encryption process without unduly affecting the security of the message.
- Rules could be applied to incoming messages to selectively encrypt and/or digitally sign portions of a message with multiple keys before passing the message on to a broadcast network that would send the same encrypted message to all clients, but where each would only be able to decrypt certain portions of the message.
- Rules could be applied to hold a certain message until one or more other messages are received with matching content from the same or other web service. For example we might wish to group messages received from both an inventory management system and an accounting system and only send on a single message based on the combined pair.

As with the examples above, these rules are inherently not address based, but act to filter the business information so that the kind of real-time information which ultimately reaches the client conforms exactly to the requirements and access rights of that client. This is a major evolution over address based routing and offers a fundamentally different approach to message routing to enable the mass publication and invocation of web-services.

Numerous advantages flow from this new approach:

- Allows real-time web services related message data to be routed to thousands/tens of thousands of users, yet mininises bandwidth overhead.
- Reduces originating server load, e.g. allowing legacy mainframes designed to service 20 terminals to output data to thousands of clients (scalability comes from the routing servers placed in the network).
- Is readily scalable using parallel routing servers, which can provide fault tolerance.
- Facilitates security (powerful encryption rules can be applied by the routing servers where permissible; where less powerful encryption is needed in a domain, then the routing servers for that domain can apply the less powerful encryption rules).
- Gives users remote from the originating server far more flexibility in handling/manipulating business information data, since they can determine their own routing rules, rather than be subject to business information data which has been centrally (and inaccurately) mandated. In effect, this yields 'mass customisation' of business information data.
- Readily facilitates application integration across multiple information sources.
- Allows web services providers to genuinely de-couple from what is happening at the client; instead, they can focus on supplying their IP, in much the same way as semiconductor IP is supplied today by 'fabless' companies.

Implementations of the present invention may include the following features:

- Structured meta-language for the data is XML or a variant of XML.
- Rules operated by a routing server are continuously updateable.
- Rules are continuously updateable by messages sent to the routing server.
- Rules are applied by the routing server in real time to the messages.
- Rules are applied by the routing server in real time to the messages depending on what needs to be rendered for viewing, hence restricting updating data to what a user is actually viewing at any instant, rather than the entire set of things which the user might be able to look at.
- Messages from a source are analysed by the routing server and the routing server applies one or more rules which result in only a sub-set of that data being routed to a client and a different sub-set to a different client.
- Messages from a source are analysed by the routing server and the routing server applies one or more rules which result in some or all of that data being combined with messages from a different source and the combined messages are then routed to a client; different clients can receive different combinations of messages.
- Multiple parallel routing servers can route from a single source to give scalability.
- If one routing server from a group of multiple parallel routing servers fails, then another routing server in that group can take over.
- Multiple series connected routing servers can perform routing.

- If multiple series connected routing servers can route, then a routing server higher up the hierarchy is insulated from needing to know the rules which will be applied by routing servers further down in the hierarchy.
- Client is a 'thin' client; different clients with different bandwidth connections can all be efficiently provided information, with clients on lower bandwidth connections not compromising the data rate for clients with higher bandwidth connections (unlike publish/subscribe systems). Clients with less computing power than a desktop PC benefit from the present approach of shifting the burden of computational analysis needed to extract the required data from the client end and into the routing server, which is typically part of the network itself
- Rules are structured as queries (e.g. xPath) applied to XML.
- Messages are Instant Messaging personal communications.

As noted earlier, the present invention finds particular application when routing data which relates to web services. Web services are characterised by one or more of the following:
- A web service is a message based information service accessible over a public or private network (such as the internet and a LAN/WAN).
- A web service can be accessed either by sending a remote request message and handling the reply message.
- A web service can also be accessed through a queuing mechanism that hides the originator and forwards messages on it's behalf.
- A web service can also be a provider of direct un-queued messages where the consumer of the web service is fed information directly from the provider where each is know explicitly to the other.
- A web service might be marshalled by an intermediary system who controls access and resources on the network.
- A web service might be handled through a transaction management middleware system that provides guarantees for multi-stage transactions across one or more web services.

Figure 3:
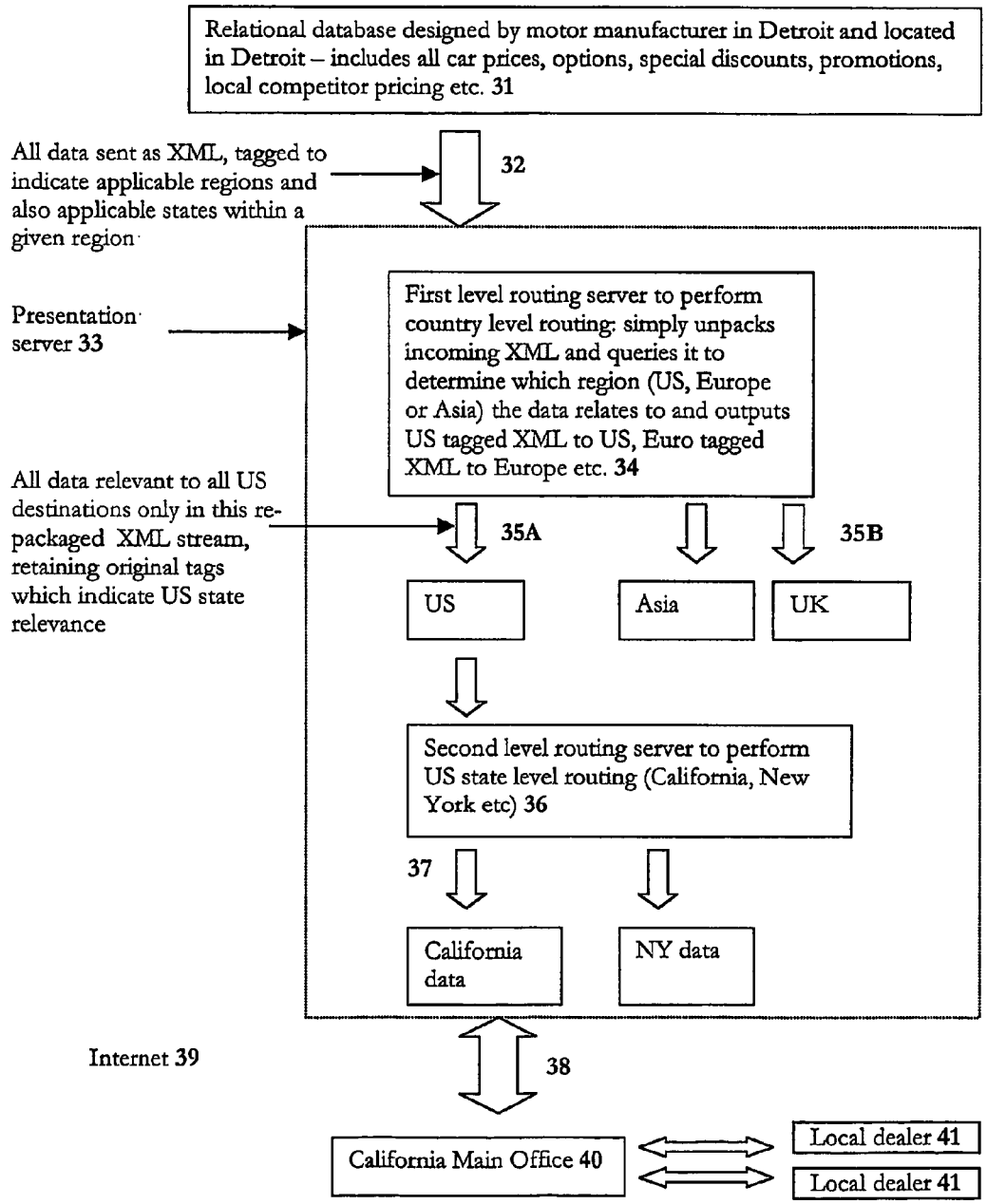

FIG. 3 illustrates a simple rule based approach relating to dealer information distribution for one Detroit based car manufacturer. The objective of this system to provide up to date data to local car dealers around the world relating to all car prices, options, special discounts, promotions, local competitor pricing etc. There may be many hundreds of dealers and each dealer may need to access large amounts of data which are specific to their local markets. Normally, this would be achieved using a relational database located in Detroit which serves the global dealership community. However, we have seen above that this query/answer model can generate extremely high data traffic volumes; further, a legacy mainframe designed to service perhaps 50 dumb terminals would certainly be unable to cope with the data demands that would be placed on it.

With the Presentation Server implementation illustrated in FIG. 3, these issues are solved. The Presentation Server (which could be located as a single server located anywhere in the network, or as multiple connected servers distributed in the network) allows a single data stream to issue from the main relational database 31; this is a set of XML tagged messages 32 which fully define all data needed to be sent to dealers; it includes tagged fields which allow efficient rule-based filtering to be applied. Imagine that the Presentation Server 33 simply has to filter incoming XML message data so that only country and state specific data is sent over the internet to dealers (Le. US dealers in California are to be continuously pushed real-time data relating only to car pricing, options, competitor pricing etc. relevant to California and not any other region). It can do this in two simple stages; at a first level 34, it can filter according to country tags embedded in the XML—e.g. all pricing data will have associated with it a country code tag specify which country it relates to (e.g. US, UK, etc.). The incoming XML messages are unpacked; i.e. data of interest to recipients is stripped out of their data envelopes and then queried by the first level routing server 34 so that US related data (of all categories, including pricing) is filtered to constitute a US specific data stream 35A, UK data is filtered to constitute a UK specific data stream 35B etc. Then, a second level routing server 36 adds further geographic refinement if needed, as it may be in the US, where there may be state specific promotions etc. The second level router 36 therefore queries for any California etc. specific promotions and other variables. It then constructs (or re-packages) XML based messages 37 specific to all California dealers and outputs these re-packaged messages 38. This is sent over the internet 39 to a California regional main office 40. This office can include its own routing servers, which can apply rules determined at that office—e.g. the incoming XML messages may include sensitive new model release data which the regional main office cannot yet release to dealers 41. It can also apply a rule which prevents that data being accessible by dealers. Local dealers can access all other data from the Detroit parent directly by accessing the Presentation Server hosted at the California regional main office. It may chose to integrate this data with other information useful at a state level (e.g. California news and traffic alerts).

This overall approach leads to many specific advantages, which have been defined in general terms above. For example:
- Minimises bandwidth overhead
- Reduces originating server load
- Is readily scalable
- Facilitates security
- Gives users remote from the originating server far more flexibility in handling/manipulating business information data
- Readily facilitates application integration across multiple information sources We look next at how querying happens and how it can be used differently from existing approaches in order to determine how information is routed through a network.

In the example above, the rules associated with routing were determined by somehow associating information tied to a user (or to an end destination machine) with the information that was being sent across the network. Another example of this would be that stock quotes are held in XML documents and are sent across as new quotes are available. A separate XML data set is maintained for the users and the rules and the responsibilities associated with them. When a new piece of information is available (such as a new stock quote), that information is sent out from the quoting application to the routing server. The routing server compares information inside the quote against a separate piece of information held in a database locally within the routing server to determine the destination or the security access for that information. For example, a quote for Amazon.com® would be compared against a list of users currently connected to determine which of them wish to receive and/or should be allowed to receive the information associated with that quote.

In a news example, news about Amazon.com similarly would be compared against a similar set of rules, except that this case has the additional constraint that only premium users get to see the news information. And so a double check is done by performing a query on the information held locally within the routing application to join together the user and the security privilege such that the information is only routed when the two match and are successful.

In order to enable data to be delivered correctly, we have determined that the routing application in the network performs look-ups or queries on the information held locally within the routing application and compares it with the data that is being transmitted across the network in order to determine where the data should be routed.

In order to perform 'on the fly' routing of data, it is necessary to have a mechanism whereby those routing applications themselves are kept up to date on the fly. For relatively static data, such as a list of users who are connected within a fairly steady enterprise, it could be conceivable that the routing application simply gets initialized with a predefined set of rules and to look up necessary information to resolve those rules whilst the machine is running. This is the most basic instance and would enable an application to perform the sort of behaviour described earlier.

If however the information that is to be compared against (or the rules that are to be used to determine the distribution of this information) change frequently, or may change during the run lifetime of the product or the application, then it becomes necessary to enable the routing application to be updated (i.e. modifications to be stored and processed by the routing server) on the fly, for rules to be added, changed or deleted, for information associated with those rules, (i.e. the look-up tables or the look-up information), to be maintained in real time and for the network to be able to distribute amongst itself this information also on the fly. This is essential to the correct, fully functional working of the routing server.

The next instance of the routing server takes the previous instance a stage further and provides for guaranteed or verifiable updating of information, the ability to ensure that the rules to be applied for the subsequent pieces of information are already in place and will be correctly applied as soon as the next information is sent.

For example, let us suppose that our user decides to cancel a premium subscription. We ought to be able to ensure that future news items sent across the network are no longer sent to this user. Similarly, if we add a new user to the routing tables we should be able to deliver information to a user. As soon as that information is available to the routing application, we should be able to update it on the fly without having to restart the routing applications. Not only should we be able to verify that the routing transaction and the routing applications have been updated correctly before we send the next piece of information, we should also at the very least have a mechanism to verify that the routers in the network have been updated. This ensures that all the information in the network is consistent and follows the correct rules. The intention here is to maintain the entire status of the network with the rules and the information being consistent at all times.

Once the network becomes the mechanism by which information is aggregated, protected and distributed, it essentially becomes an intelligent processor of information prior to being displayed to an end user. It is essential that we have mechanisms in place to validate this state of the network at any point in time.

In a separate instance, we now deal with the issue of clustered nodes or clustered routers and the way in which they behave.

First, the intention is that all routing applications in the network should contain an identical set of rules and look up information associated with those rules and should behave individually in a manner that will ensure the correct delivery of the information. Whilst this may introduce some overhead with repeated look-ups occurring as the information is successfully transmitted throughout the network, the simplicity and robustness of this approach is relevant for certain applications.

The advantage would be that should any one of these routing applications fail, any user applications that wish to subscribe to this information may simply re-subscribe to an alternative but valid and working routing application and therefore, effectively reroute themselves and surviving significant attrition within the network application increasing robustness and stability.

Similarly, by taking a fairly simple approach we are able to build a highly scalable system without the complexity of determining rules that differ throughout the network.

A further instance of a clustered application would be where the routers support different rules and where half of that information and the way in which it is transmitted to the end user is successively determined as the information travels the network.

This may be important in cases where the rules that should apply are determined not only by a global criteria such as user name and subscription rate, but might be determined locally in addition to that by physical location or the device from which the user is connecting. In other words, it may be valid to send stock quotes to a mobile telephone but not long news articles. Therefore, in this instance, it might be possible through the network to configure the information such that, if you are connected through a telephone device with a small screen and low bandwidth, to prevent those messages arriving at the phone or potentially for a subset of that information to be sent to a phone. An example would be whereby the headline of a news article may be transmitted to the phone but the entire content of the article is prevented from being sent.

Similarly, it may be that within an enterprise local area network we build in rules that allow all information to be transmitted, yet if you are connected from an outside device, that information might be restricted. That way, only users inside an enterprise can access the information and from outside the enterprise less of that information is available simply due to the security restrictions, or potentially due to other reasons such as limited bandwidth or relevance etc.

Further instances include the following:

'Data Routing' can be used to intelligently feed a message broadcast network which would be used to distribute mass content to many clients, perhaps even over a robust private network (e.g. we might use an established broadcast mechanism to deliver the same subset of NAS-DAQ® stock quotes for just integrated circuit design companies to all clients).

A further instance is where we extend this to allow additional ad-hoc connections from one or more of the clients to the server to retrieve unique content to them in addition to the mass broadcast info (e.g. we might send per-client portfolio information to each client in addition to the stock quotes sent above).

A further instance is where we maintain a separate full-time connection to a client to stream/push new/updated information (eg notification that a sell order for some stock in their portfolio has been fulfilled). A client could poll to establish connection with the server on a regular or ad-hoc basis rather than there being a separate full-time connection tied up for each client.

The invention claimed is:

1. A method of routing data from multiple sources to multiple clients over a network;

including the following steps:
(a) unpacking the data content of multiple incoming messages from their respective message data envelopes, with the data content conforming to a structured meta-language and including tagged fields that allow rule based filtering to be applied using those tagged fields; and the routing being performed by a routing server applying rule-based filtering to the data, with:
(b) the routing server performing the rule based filtering using the tagged fields when querying the data content; and
(c) the routing server then combining the data content from multiple incoming messages previously sent for unpacking into a single outgoing network message;
and wherein the unpacked data is analysed by the routing server and the routing server applies the rule-based filtering which results in (a) only a sub-set of that data being packaged into one or more messages and then routed to a client and (b) a different sub-set of that data being packaged into one or more messages and then routed to a different client.

2. The method of claim 1 in which the structured meta-language is XML.

3. The method of claim 1 in which the rule-based filtering applied by the server is continuously updateable.

4. The method of claim 3 in which the rule-based filtering is continuously updateable by a message, or a sub-set of a message, being received and processed by the server.

5. The method of claim 4 in which the rule-based filtering is applied by the server in real time to the data.

6. The method of claim 5 in which the rule-based filtering is applied by the server in real time to the data depending on what needs to be rendered for viewing at a client, hence restricting updating data to what a client is actually looking at, rather than the entire set of things which the client might be able to look at.

7. The method of claim 1 in which multiple parallel servers can route from a single source to give scalability.

8. The method of claim 7 in which if one server from a group of multiple parallel servers fails, then another server in that group can take over.

9. The method of claim 1 in which multiple series connected servers can perform routing.

10. The method of claim 9 in which a server higher up the hierarchy of a series is insulated from needing to know the or each rule which will be applied by a server further down in the hierarchy.

11. The method of claim 1 in which the rule-based filtering is a member selected from the following group of rules:
(a) Route data based on a user's unique identifier;
(b) Route data based on security privileges;
(c) Route data based on rules about client and network performance;
(d) Route data based on rules about performance, of the server supplying the data, so that if one or more of the servers supplying the data becomes overloaded, the routing server could be used to limit access to the busy server;
(e) Route data based on per-user customisation and security rules delegated by a legacy server;
(f) Route data following rules to divert certain content of an incoming message over an expensive but highly secure network whilst some or all of the remaining content is sent through the public network;
(g) Route data by selectively encrypting and/or digitally signing portions of a message before passing it on, reducing the CPU cost of the encryption process without unduly affecting the security of the message;
(h) Route data by selectively encrypting and/or digitally signing portions of a message with multiple keys before passing the message on to a broadcast network that would send the same encrypted message to all clients, but where each would only be able to decrypt certain portions of the message;
(i) Route data by holding a certain message until one or more other messages are received with matching content.

12. The method of claim 2 in which the rule-based filtering is structured as Xqueries comparing data against data held locally in the server.

13. The method of claim 1 in which the data is Instant Messaging personal communications.

14. The method of claim 1 in which the data is web services related data.

15. An apparatus comprising a processor and memory programmed, using program data stored on a computer readable medium, to route data from multiple sources to multiple clients over a network, wherein:
the apparatus applies rule-based filtering to the data;
the apparatus unpacks the data content of multiple, incoming network messages from their respective data envelopes, with the data content conforming to a structured meta-language and including tagged fields that allow rule based filtering to be applied using those tagged fields; and the routing being performed by a routing server applying rule-based filtering to the data, wherein:
the apparatus performs the rule based filtering using the tagged fields, and constructs a single outgoing network message by combining data content of multiple incoming messages previously sent for unpacking;
and wherein the unpacked data is analysed and then the rule-based filtering is applied which results in (a) only a sub-set of that data being packaged into one or more messages and then routed to a client and (b) a different sub-set of that data being packaged into one or more messages and then routed to a different client.

16. The apparatus of claim 15 which enables the rule-based filtering to be continuously updateable.

17. The apparatus of claim 16 in which the rule-based filtering is continuously updateable by a message, or a sub-set of a message, which the apparatus stores and processes.

18. The apparatus of claim 17 in which the apparatus applies the rule-based filtering in real time to the data.

19. The apparatus of claim 15 in which the rule-based filtering is applied in real time to the data depending on what needs to be rendered for viewing at a client, hence restricting updating data to what a client is actually looking at, rather than the entire set of things which the client might be able to look at.

20. The apparatus of claim 15 when organised into multiple parallel servers which can route from a single source to give scalability.

21. The apparatus of claim 20 in which if one server from a group of multiple parallel servers fails, then another server in that group can take over.

22. The apparatus of claim 15 when organised into multiple series connected servers to perform routing.

23. The apparatus of claim 22 in which a server higher up the hierarchy of a series is insulated from needing to know the or each rule which will be applied by a server further down in the hierarchy.

24. The apparatus of claim 15 in which the rule-based filtering is a member selected from the following group of rules:
   (a) Route data based on a user's unique identifier;
   (b) Route data based on security privileges;
   (c) Route data based on rules about client and network performance;
   (d) Route data based on rules about performance, of the server supplying the data, so that if one or more of the servers supplying the data becomes overloaded, the routing server could be used to limit access to the busy server;
   (e) Route data based on per-user customisation and security rules delegated by a legacy server;
   (f) Route data following rules to divert certain content of an incoming message over an expensive but highly secure network whilst some or all of the remaining content is sent through the public network;
   (g) Route data by selectively encrypting and/or digitally signing portions of a message before passing it on, reducing the CPU cost of the encryption process without unduly affecting the security of the message;
   (h) Route data by selectively encrypting and/or digitally signing portions of a message with multiple keys before passing the message on to a broadcast network that would send the same encrypted message to all clients, but where each would only be able to decrypt certain portions of the message;
   (i) Route data by holding a certain message until one or more other messages are received with matching content.

25. The apparatus of claim 15 in which the rule-based filtering is structured as Xqueries comparing data against data held locally in the apparatus.

* * * * *